United States Patent [19]

Hoffman et al.

[11] 4,286,322
[45] Aug. 25, 1981

[54] TASK HANDLING APPARATUS

[75] Inventors: Roy L. Hoffman, Pine Island; William G. Kempke, Rochester, both of Minn.; John W. McCullough, Atlanta, Ga.; Frank G. Soltis; Richard T. Turner, both of Rochester, Minn.

[73] Assignee: International Business Machines Corporation, Armonk, N.Y.

[21] Appl. No.: 54,508

[22] Filed: Jul. 3, 1979

[51] Int. Cl.³ .............................................. G06F 9/06
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,496,551 | 2/1970 | Driscoll et al. | 364/200 |
| 4,047,161 | 9/1977 | Davis | 364/200 |
| 4,084,228 | 4/1978 | Dufond et al. | 364/200 |
| 4,152,761 | 5/1979 | Louie | 364/200 |
| 4,177,513 | 12/1979 | Hoffman et al. | 364/200 |

*Primary Examiner*—Gareth D. Shaw
*Assistant Examiner*—Thomas M. Heckler
*Attorney, Agent, or Firm*—Donald F. Voss

[57] ABSTRACT

Improved task handling apparatus for a computer system where the task dispatcher is selectively operable under instruction control for performing task queue selection and where the intertask communication mechanism can return a task dispatching element (TDE) to a non-prime task dispatching queue (TDQ) as well as to the prime TDQ. Whenever a TDE is returned to the prime TDQ, the task dispatcher makes a pre-emptive task switch. Also, if there are no task dispatching elements on the current non-prime TDQ, the task dispatcher switches to dispatch TDE's from the prime TDQ.

8 Claims, 26 Drawing Figures

| TASK ACTIVITY TRANSITIONS FROM \ TO | ACTIVE | INACTIVE DISPATCHABLE | INACTIVE WAITING |
|---|---|---|---|
| ACTIVE | — | SEND (HIGHER PRIORITY TDE MOVED TO TDQ) / DTDQ | RECEIVE (NOT SATISFIED) |
| INACTIVE DISPATCHABLE | RECEIVE (BY ACTIVE TASK) / DTDQ | — | NOT POSSIBLE |
| INACTIVE WAITING | SEND (CAUSING THIS TDE TO MOVE TO TOP OF TDQ) | SEND (CAUSING THIS TDE TO MOVE NON TOP OF TDQ) | — |

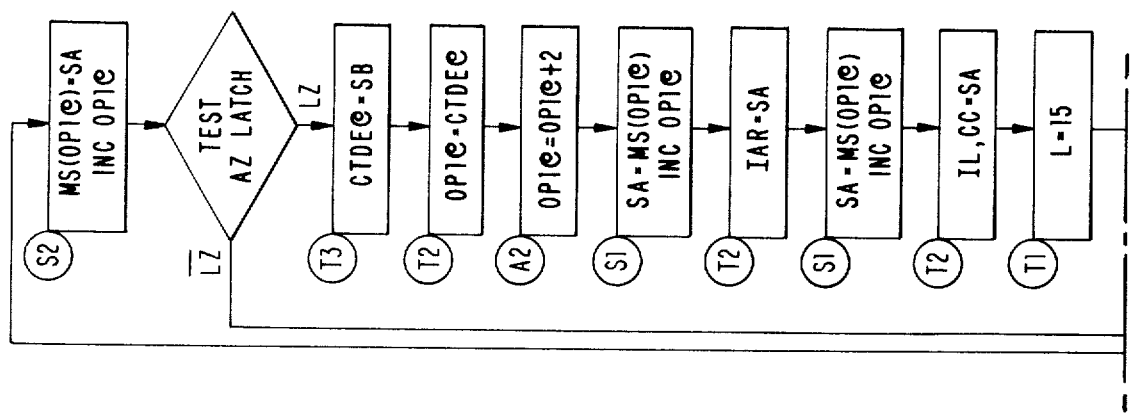
FIG. 9-1
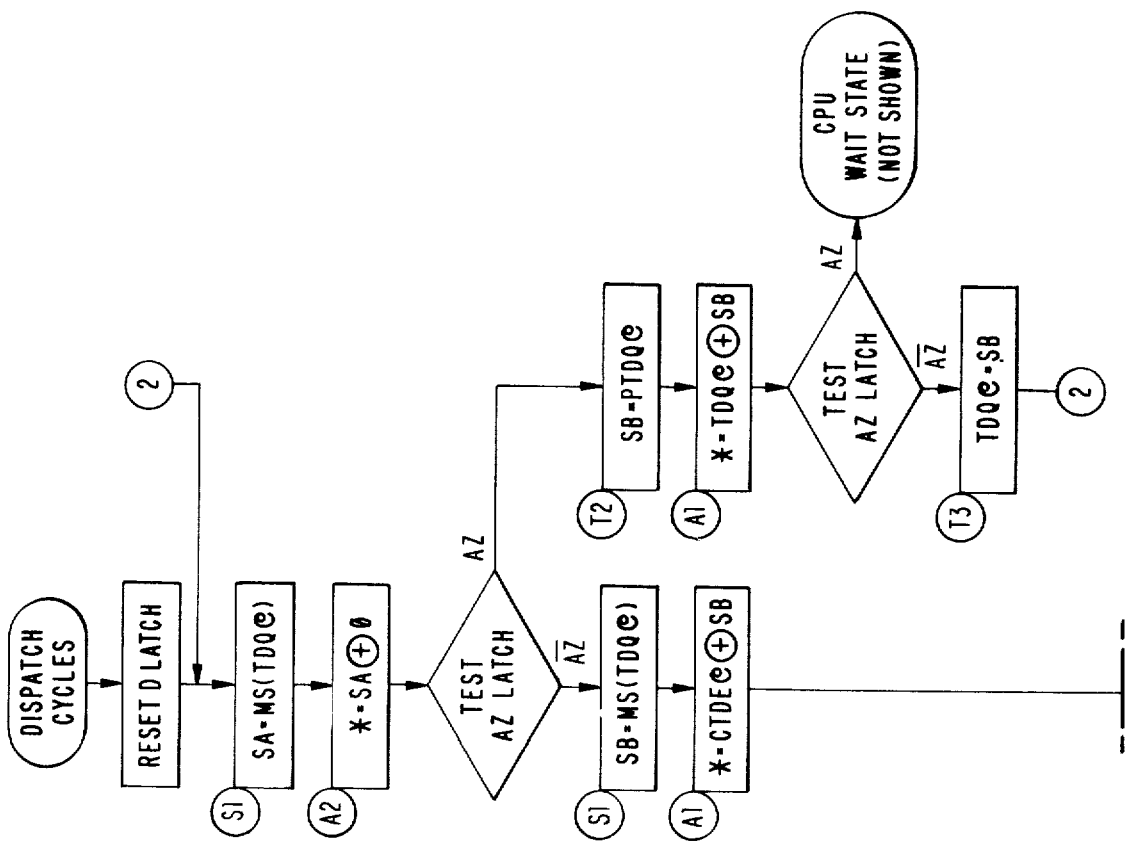

TASK HANDLING APPARATUS

DESCRIPTION

1. Technical Field

This invention relates to improved task handling apparatus in a computer system. The principal objects of the invention are to provide improved task handling apparatus which:

a. has a more flexible priority structure;
b. provides for immediate processing of system functions whenever a task dispatching element is returned to a prime task dispatching queue, and
c. has minimum sensitivity to introduction of new applications on the computer system.

The foregoing objects are achieved by structuring the task handling apparatus to have the facility to explicitly invoke the task dispatcher in addition to its invocation via the task communication and synchronization mechanisms. Tasks generally have their own response requirements. Because of this task handling apparatus which operates solely on the basis of priority has less flexibility in that task switches take place whenever a higher priority task dispatching element enters the task dispatching queue. The current task dispatching element may only have a small amount of work remaining and yet it has to give up control of its resources to allow the higher priority task to run. It then, after its priority is again the highest on the task dispatching gueue, has to recapture the resources necessary for it to complete its work. Such an arrangement tends to result in greater inefficiencies because of the relatively large number of task switches that take place.

In the present invention multiple task dispatching queues are provided where one of the task dispatching queues is a prime task dispatching queue and all others are non-prime task dispatching queues. The prime task dispatching queue is loaded with task dispatching elements which must run when they become dispatchable, i.e. system type tasks such as I/O tasks, storage management tasks, etc., and the non-prime task dispatching queues are loaded with application-type tasks. Task dispatching takes place on a priority basis out of the prime task dispatching queue. Explicit invocation of the task dispatcher switches task dispatching to the prime task dispatching queue or to a non-prime or secondary task dispatching queue. Return to the prime task dispatching queue takes place whenever a task dispatching element is returned to the prime task dispatching queue and thereby requiring a pre-emptive task switch or when the current non-prime task dispatching queue becomes empty or when an explicit instruction for such return is executed. Task dispatching out of non-prime task dispatching queues also takes place on a priority basis but there are no pre-emptive task switches between non-prime task dispatching queues.

The task dispatcher is explicity invoked by a dispatch task dispatching queue (DTDQ) instruction. Although any instruction stream of a task dispatching element could contain the dispatch task dispatching queue instruction, normally the scheduling program of the scheduling function task dispatching element on the prime task dispatching queue is the only program that would issue the dispatch task dispatching queue instruction.

2. Background Art

Task dispatching apparatus of the type set forth in commonly assigned Application Ser. No. 813,901 now U.S. Pat. No. 4,177,513 for Task Handling Apparatus for a Computer System by R. L. Hoffman, et al, provided an improvement over prior art systems which had one priority resolution mechanism for CPU tasks and another priority resolution mechanism for input/output tasks. In that Application the priority resolution mechanism was common for CPU and input/output tasks. Task dispatching, however, took place only on a priority basis, and the task dispatcher could not be explicitly invoked. It was only invoked via the task communication and synchronization mechanisms. That particular arrangement resulted in lower performance than with the present invention because it did not tend to minimize task switches. Also, that arrangement was more sensitive to introduction of new applications on the computer system than the present invention.

The present invention also enhances performance by using multiple task dispatching queues. One of the task dispatching queues is a prime task dispatching queue and all others are non-prime task dispatching queues. The prime task dispatching queue is loaded with task dispatching elements which must run when they become dispatchable, i.e. system type tasks such as I/O tasks, storage management tasks, etc., and the non-prime task dispatching queues are loaded with application type tasks. Although task dispatching out of a non-prime task dispatching queue takes place on a priority basis relative to the task dispatching elements on that queue, there is no priority pre-emption amongst non-prime task dispatching queues. Hence, if an application task is running it will not be preempted by another application task on another non-prime task dispatching queue. However, it could be preempted by a system type task which becomes dispatchable on the prime task dispatching queue or by a higher priority task on the same non-prime task dispatching queue. The present invention solved the problem of returning to the prime task dispatching queue whenever there are no task dispatching elements on the current non-prime task dispatching queue or whenever a task dispatching element is returned to the prime task dispatching queue requiring a pre-emptive task switch.

BRIEF DESCRIPTION OF DRAWINGS

FIG. 2 is a diagram illustrating connective relationships between user and I/O tasks;

FIGS. 4-1 and 4-2 with FIG. 4-2 disposed to the right of FIG. 4-1 taken together are a diagram illustrating interrelationships between a TDQ, SRQ, SRC instruction stream and base registers.

FIGS. 9-1 and 9-2 with FIG. 9-1 disposed above FIG. 9-2 taken together are a flow diagram illustrating dispatch cycles;

FIGS. 14-1 and 14-2 with FIG. 14-1 disposed above FIG. 14-2, taken together are a flow diagram illustrating REMOVE cycles;

DISCLOSURE OF INVENTION

Figure 1:
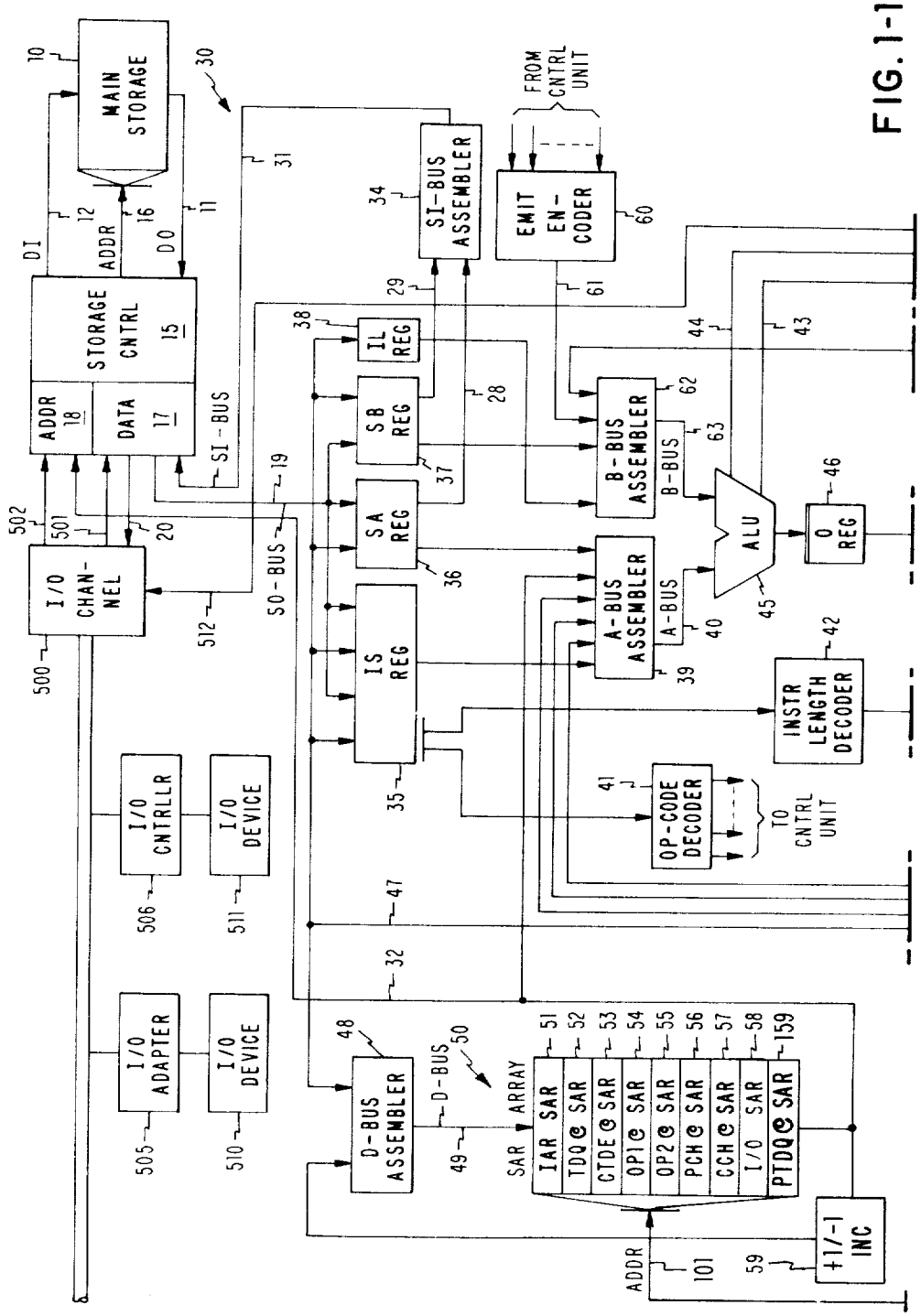
FIGS. 1-1 and 1-2 with FIG. 1-1 disposed above FIG. 1-2 taken together are a block diagram of a computer system embodying the invention.
Figures 1, 2:
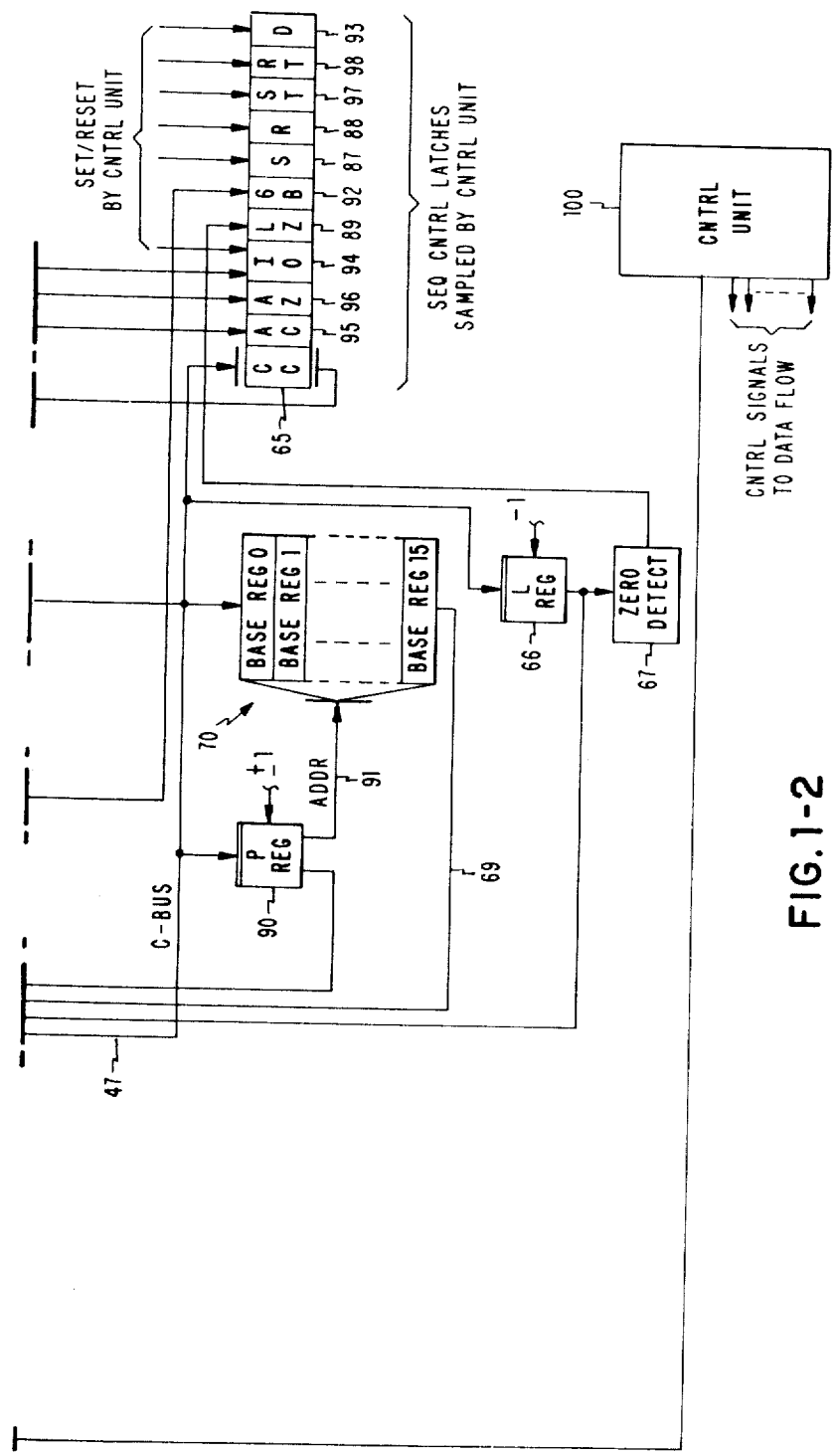
Figure 2:
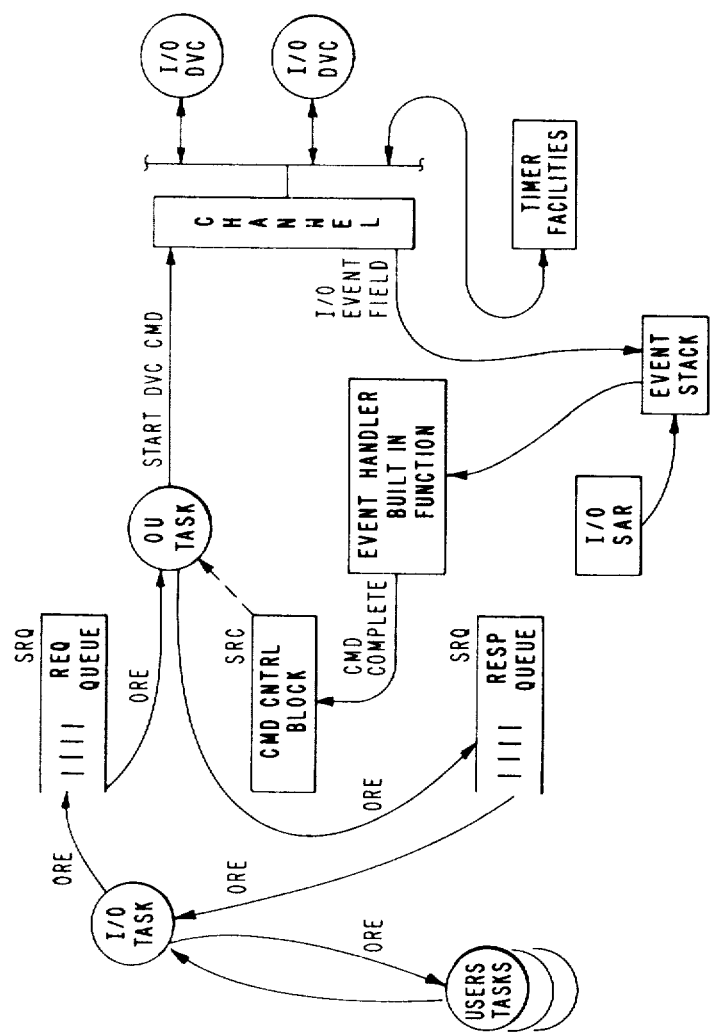

With reference to the drawings and particularly to FIGS. 1-1 and 1-2 the invention, by way of example, is illustrated as being incorporated into a stored program computer system which is a modification of the computer system shown and described in commonly assigned U.S. patent application Ser. No. 813,901 for Task Handling Apparatus for a Computer System by R. L. Hoffman, et al, and incorporated herein by reference. Like elements are referred to using the same reference characters. The improvement provided by the present invention required modification of the referenced computer system to enable execution of a dispatch task dispatching queue (DTDQ) instruction shown in FIG. 3, to include a prime task dispatching queue, PTDQ and one or more non-prime TDQ's with the ability to return task dispatching elements (TDE's) to designated TDQ's including the prime and non-prime TDQ's, a mechanism for invoking the task dispatcher so as to dispatch tasks from the prime TDQ when the current non-prime TDQ is empty, i.e. there are no TDE's on the non-prime TDQ and modification to the SEND mechanism to enable examination of the TDQ destination field so as to be able to return a TDE to a designated TDQ. Also the task dispatcher is invoked whenever a TDE is enqueued on the prime TDQ even though task dispatching has been taking place out of a non-prime TDQ, and there are still TDE's on that non-prime TDQ. The RECEIVE mechanism is not changed. If the active TDE on the non-prime current TDQ executes a receive message instruction (RECM) which is not satisfied, the active TDE will be removed from the non-prime TDQ, and if there are no other TDE's on that non-prime TDQ, the RECEIVE mechanism invokes the task dispatcher to switch to the prime TDQ.

Figure 3:
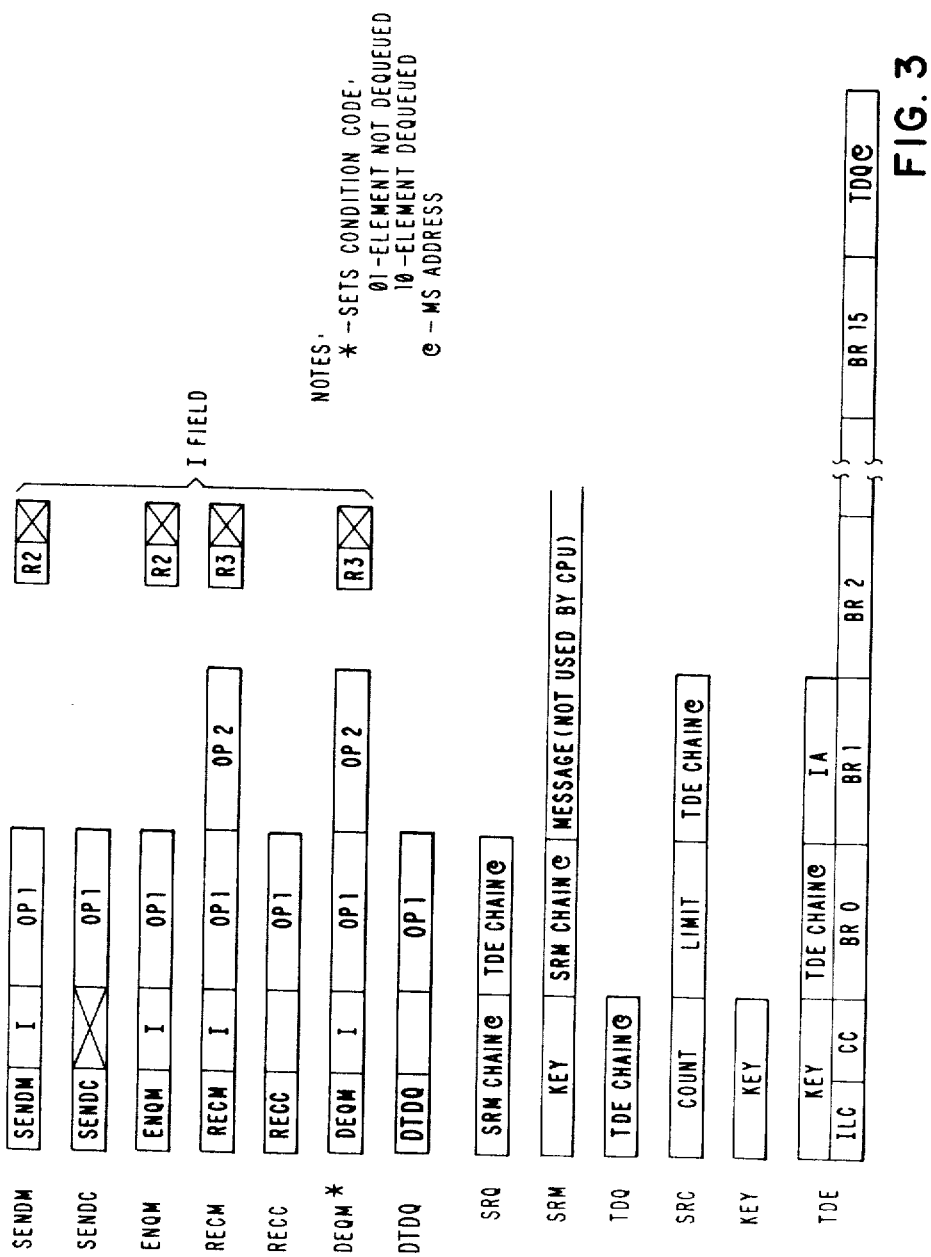
FIG. 3 is a diagram illustrating the format of queueing instructions and objects.
Figures 1, 4:
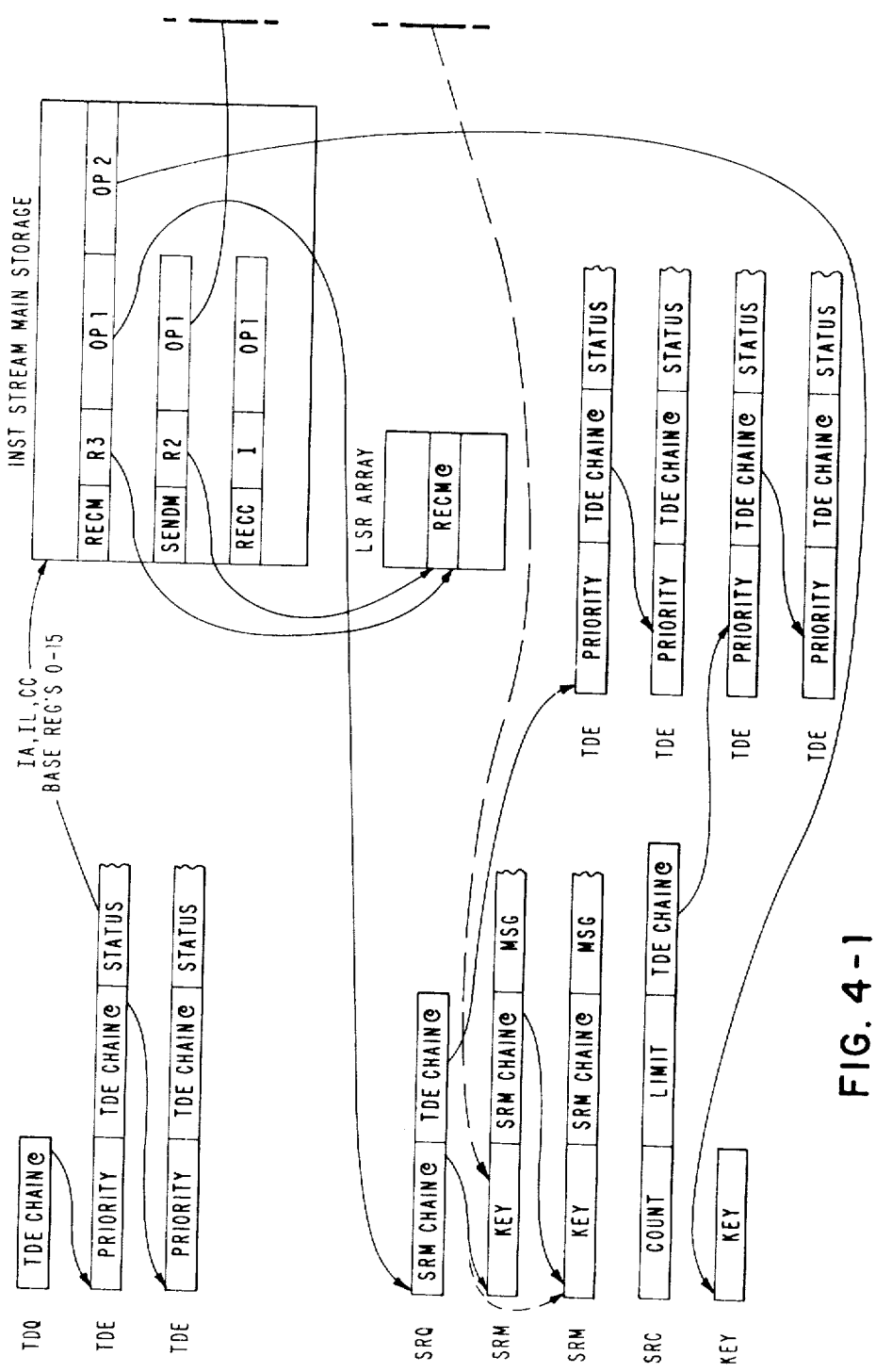

The computer system set forth in FIGS. 1-1, 1-2 now includes a prime TDQ@ SAR 159 and the TDQ@ SAR 52 is the current TDQ@ SAR. The TDE object as shown in FIG. 3 is modified to include a TDQ ADDRESS field (TDQ@) for designating a TDQ to which the TDE is to be enqueued. The prime TDQ@ SAR 159 is selected in the same manner as the other registers in the SAR array 50, i.e. by an address from control unit 100 on bus 101.

Initially TDQ@ SAR 52 and prime TDQ@ SAR 159 will have the same address. The prime TDQ object contains the TDE CHAIN ADDRESS which is fetched from main storage 10 and entered into the current TDE@ SAR 53. The current TDE address from register 53 is transferred into the OP1 SAR register 54. The TDE address in OP1 SAR register 54 is then incremented by two words so as to point to the instruction address field (IA) contained in the TDE. The incrementing of the current TDE address by two words takes place in the manner described in the referenced Application Ser. No. 813,901. The instruction address field of the current TDE for example could point to an instruction of a scheduling program which could contain a DTDQ instruction, FIG. 3, in its instruction stream.

Figure 7:
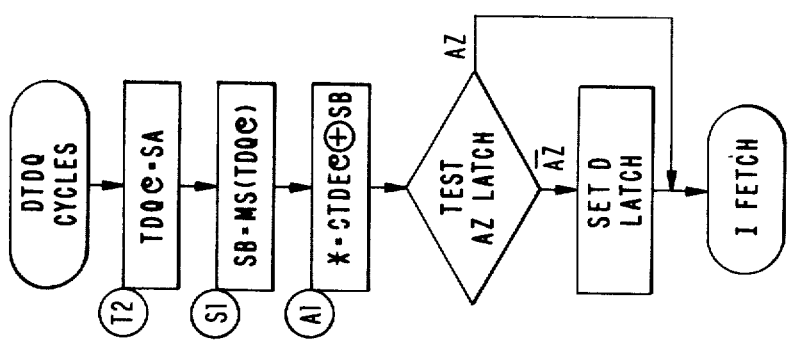
FIG. 7 is a flow diagram illustrating DTDQ cycles.
Figures 2, 4:
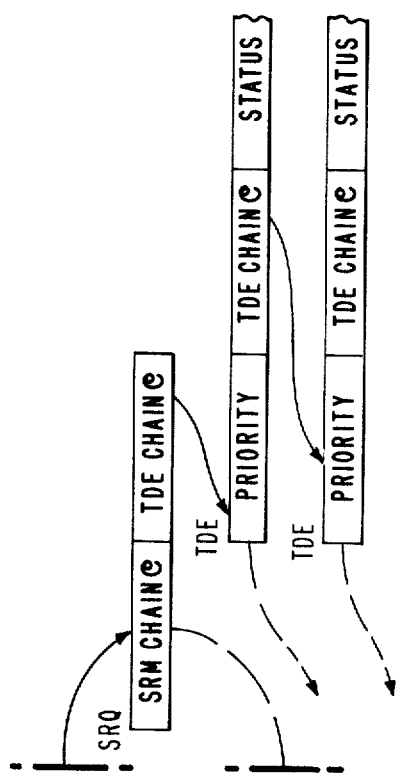
Figures 5, 6:
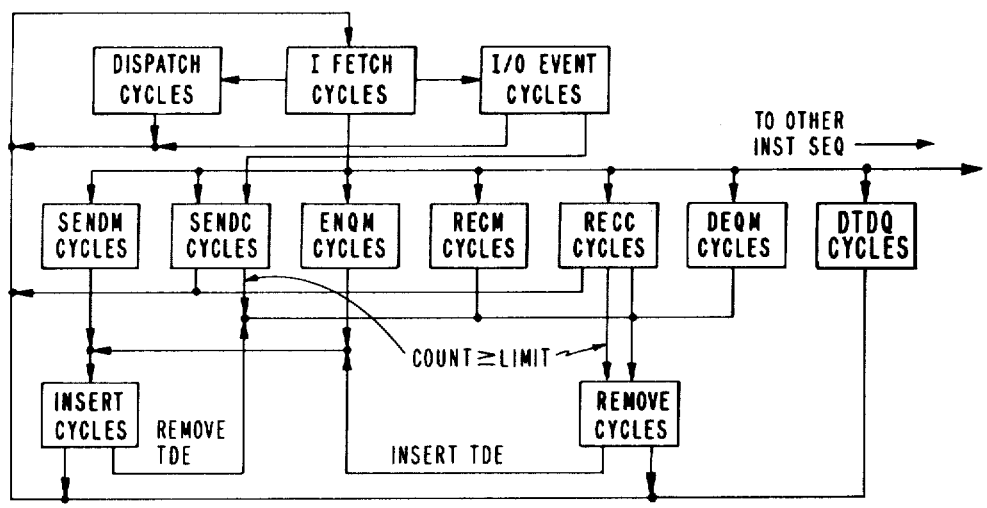
FIG. 5 is a diagram illustrating task state transitions.
FIG. 6 is a diagram illustrating control unit cycle sequence interrelationships.
Figure 8:
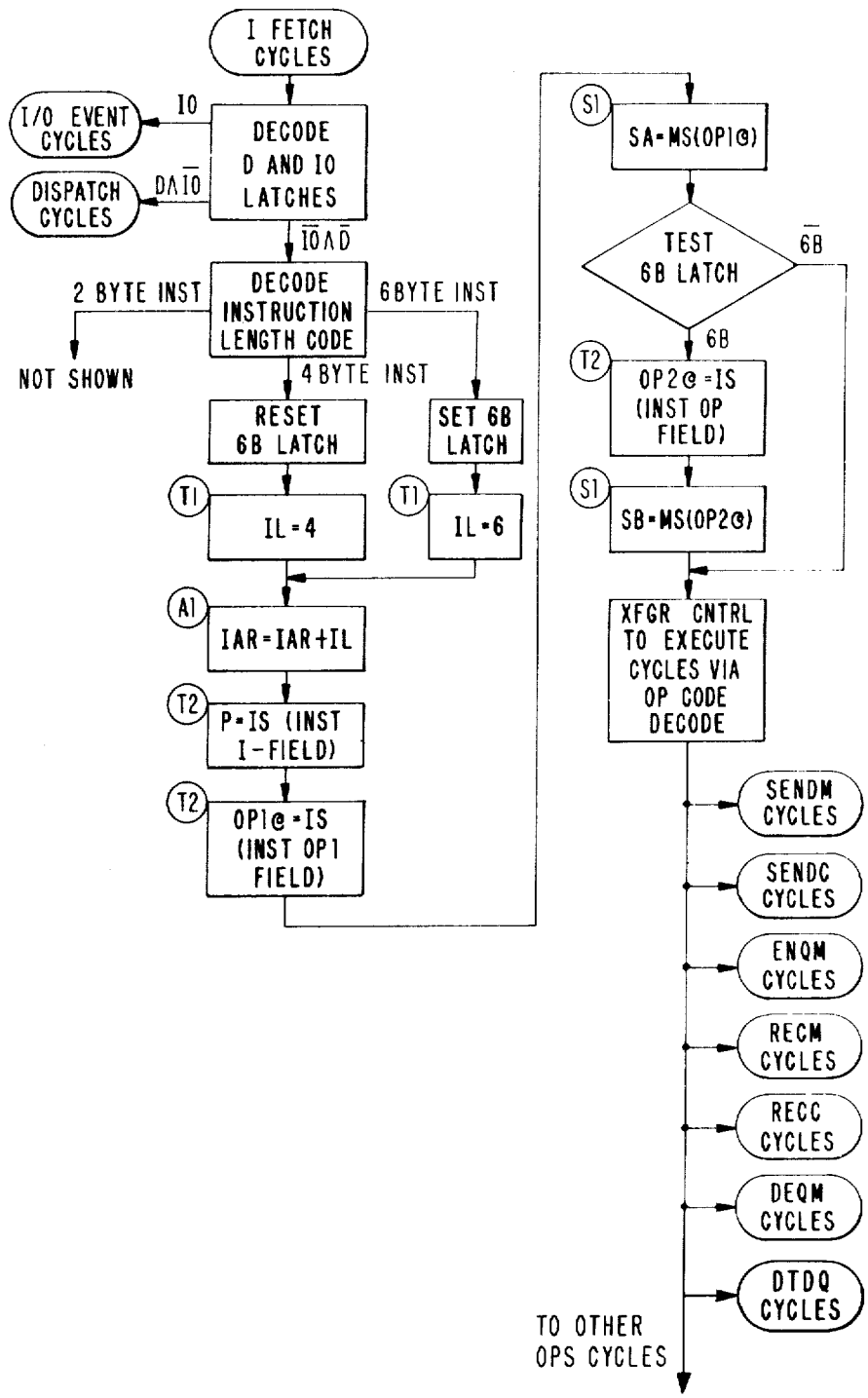
FIG. 8 is a flow diagram illustrating I-fetch cycles.

The dispatch TDQ (DTDQ) instruction has a format similar to the receive count instruction (RECC) in that it includes an OP code and an OP1 field but the I field is blank. The OP1 field contains the address of a designated TDQ. This operand upon being fetched from main storage 10 is loaded into SA register 36 during I-fetch of the DTDQ instruction. Upon completion of I-fetch, as seen in FIGS. 6 and 8, the operation switches to DTDQ cycles, FIG. 7, and the first cycle taken is a T2 cycle for transferring the contents of SA register 36 into the TDQ@ SAR 52. A S1 storage cycle is then taken to fetch the address of the top TDE on the newly designated current TDQ into SB register 37. An A1 arithmetic cycle is then executed to compare the current TDE address which is in the CTDE@ SAR 53 with the address of the top TDE on the newly designated TDQ. As a result of this operation, AZ latch 96 is tested and if latch 96 is set, the operation switches back to I-fetch for fetching the next sequential instruction. If the AZ latch 96 is not set, then D latch 93 is set by control 100 and the operation switches back to I-fetch. However, with the D latch 93 set, dispatch cycles will be taken as seen in FIGS. 6, 9-1 and 9-2 to perform a task switch.

Figures 2, 9:
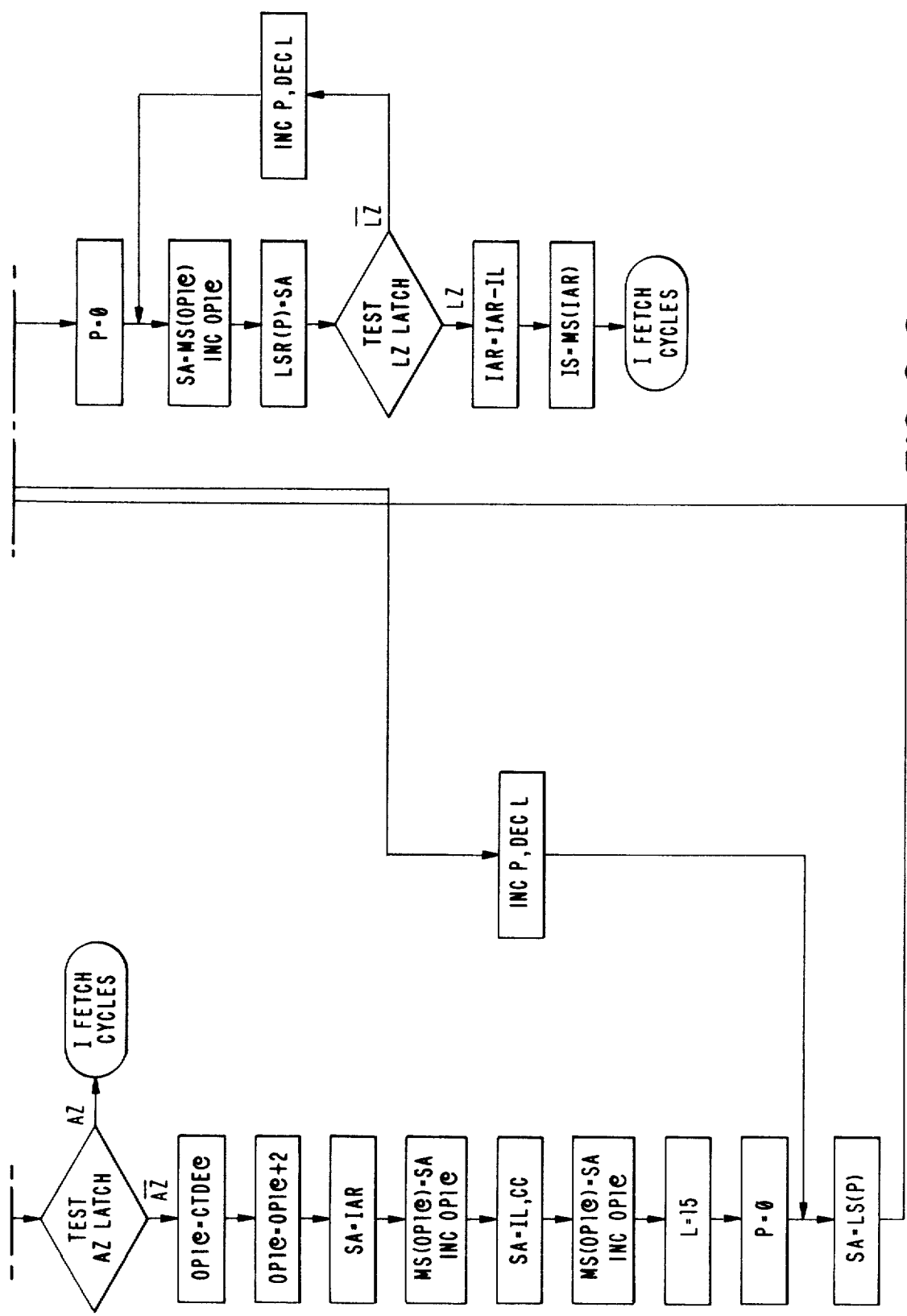
Figure 10:
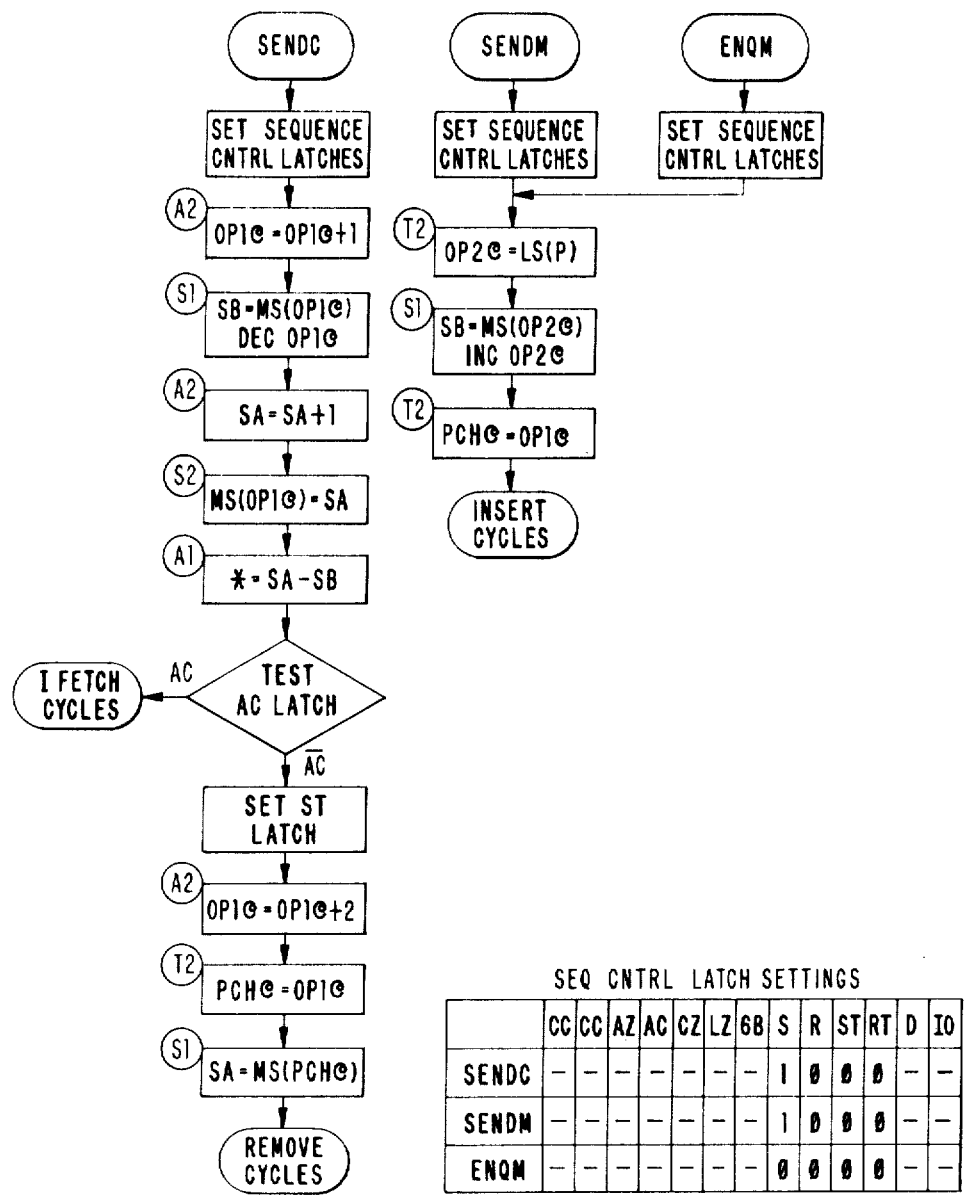
FIG. 10 is a flow diagram illustrating SEND COUNT, SEND MESSAGE and ENQUEUE MESSAGE execution cycles.

The dispatch cycles, FIGS. 9-1 and 9-2, which have been modified from those in referenced application Ser. No. 813,901 are entered. The D latch 93 is reset and the designated non-prime TDQ address is used to address main storage 10. The contents of the addressed location, i.e. the TDE Chain@, are loaded into SA register 36. An A2 CPU cycle is then executed to determine if the contents of SA, i.e. the TDE Chain@, are zero. If they are zero, AZ latch 96 is set, and if not, AZ latch 96 is reset. If AZ latch 96 is set, it is indicative that the non-prime TDQ is empty and as it will be seen shortly the current TDQ@ is changed by loading the TDQ SAR 52 with the PTDQ@ from SAR 159. This is accomplished by executing a T2 cycle to load the SB register 37 with the address of the prime TDQ, i.e. the contents of register 159 to facilitate comparing the current and prime TDQ addresses. An A1 cycle is then taken to compare the current TDQ address with the prime TDQ address, i.e., the contents of register 37. AZ latch 96 is then tested and if set, the central processing unit enters a wait state. If the AZ latch 96 is not set, a T3 cycle is taken to transfer the contents of SB register 37 into TDQ@ SAR 52 whereby the prime TDQ address becomes the current TDQ address and the operation loops back to where the SA register 36 is loaded with the TDE Chain@ fetched from main storage 10 using the current TDQ address which is now the prime TDQ address. Of course, if the non-prime TDQ were not empty, the AZ latch 96 would not have been set and the dispatch cycles would proceed with a S1 CPU cycle in the manner as described in referenced application Ser. No. 813,901.

Figure 15:
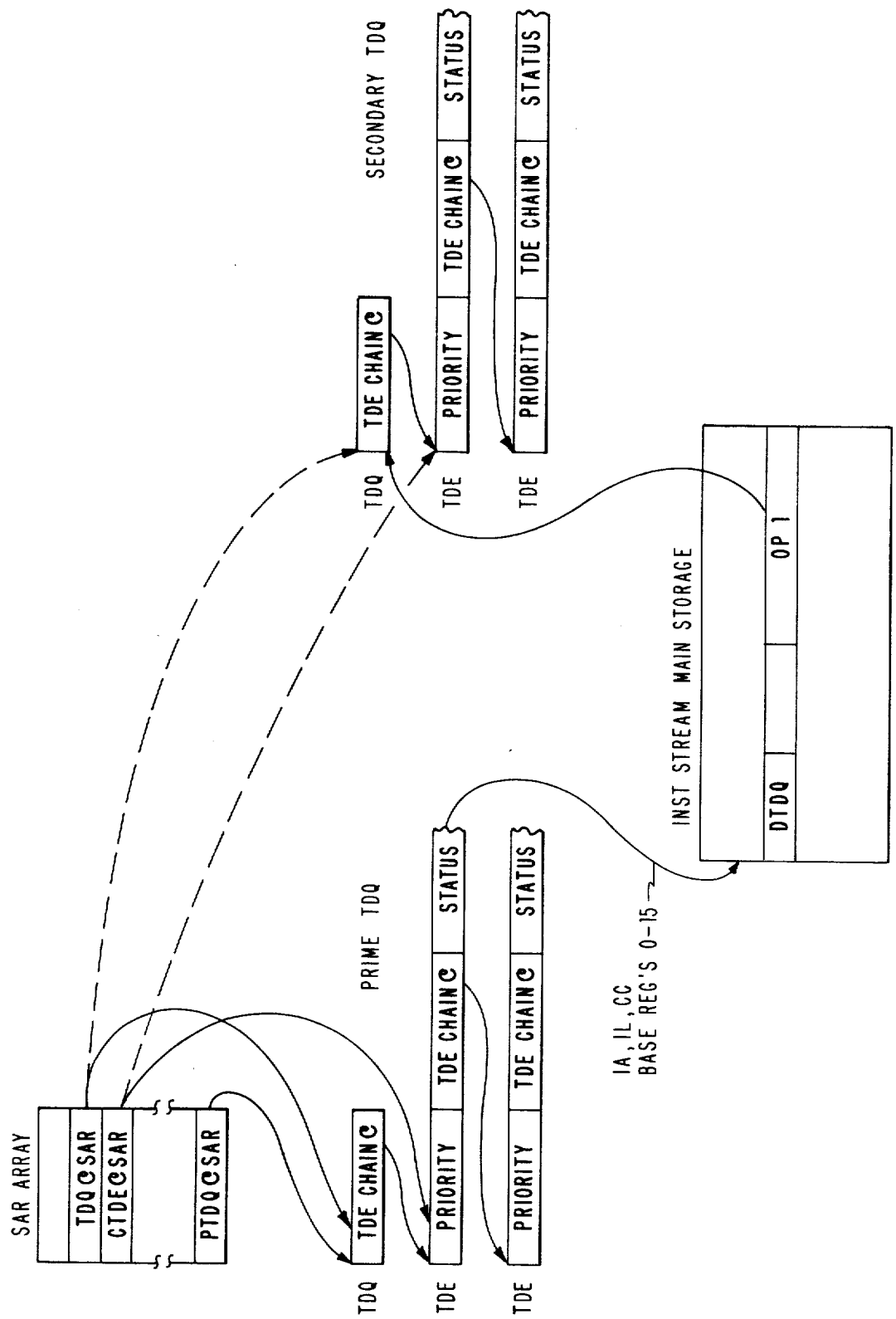
FIG. 15 is a diagram illustrating the instruction stream of a task dispatching element on the prime TDQ where the instruction being executed is a DTDQ instruction.

Execution of a DTDQ instruction in the instruction stream of a task dispatching element on the prime TDQ is diagramatically illustrated in FIG. 15. It is seen that initially both the PTDQ@ SAR 159 and TDQ@ SAR 52 point to the prime TDQ object. This prime TDQ object contains a TDE chain address which points to the highest priority TDE on the prime TDQ. This highest priority TDE on the prime TDQ is also the current TDE and hence is pointed to by the CTDE@ SAR 53. The current TDE has an associated instruction stream in main storage 10 and the instruction being executed is a DTDQ instruction. The OP1 field of that instruction points to a TDQ object of a secondary or non-prime TDQ. The TDQ@ SAR 52 is updated to point to that secondary TDQ. That secondary TDQ object has a TDE chain address which points to the highest priority TDE on that secondary TDQ. The CTDE@ SAR 53 is updated to point to that highest priority TDE on the secondary TDQ. The instruction stream of that highest priority TDE on the secondary TDQ then begins to execute after the task switch has taken place.

Figure 16:
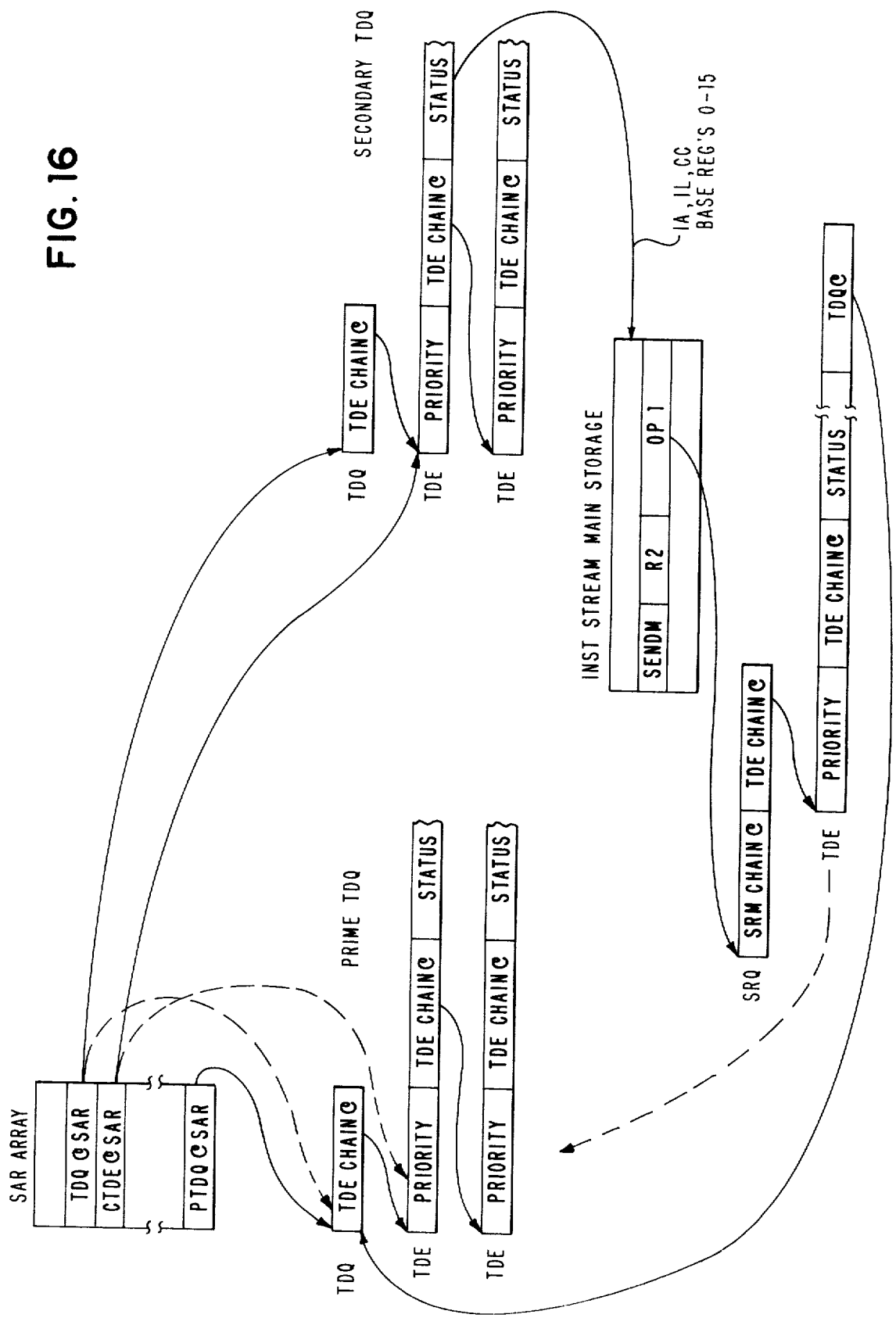
FIG. 16 is a diagram illustrating a task dispatching element on a secondary TDQ where the instruction stream for that task dispatching element is executing a SEND MESSAGE instruction and a SRQ has a TDE waiting to be sent to the prime TDQ.

FIG. 16 illustrates that the instruction stream for that highest priority TDE on a secondary TDQ issues a send message (SENDM) instruction. The OP1 field of the send message instruction which is described in detail in the referenced application, Ser. No. 813,901, points to a send-receive queue, SRQ, which has an inactive waiting TDE enqueued thereon. A modified send mechanism uses the TDQ@ field of the inactive waiting TDE to enqueue that TDE in priority sequence onto the designated TDQ and in this instance the prime TDQ. This is accomplished by first performing remove cycles to remove the inactive waiting TDE from the SRQ and then perform insert cycles to insert the removed TDE in priority sequence onto the prime TDQ.

Figures 1, 14:
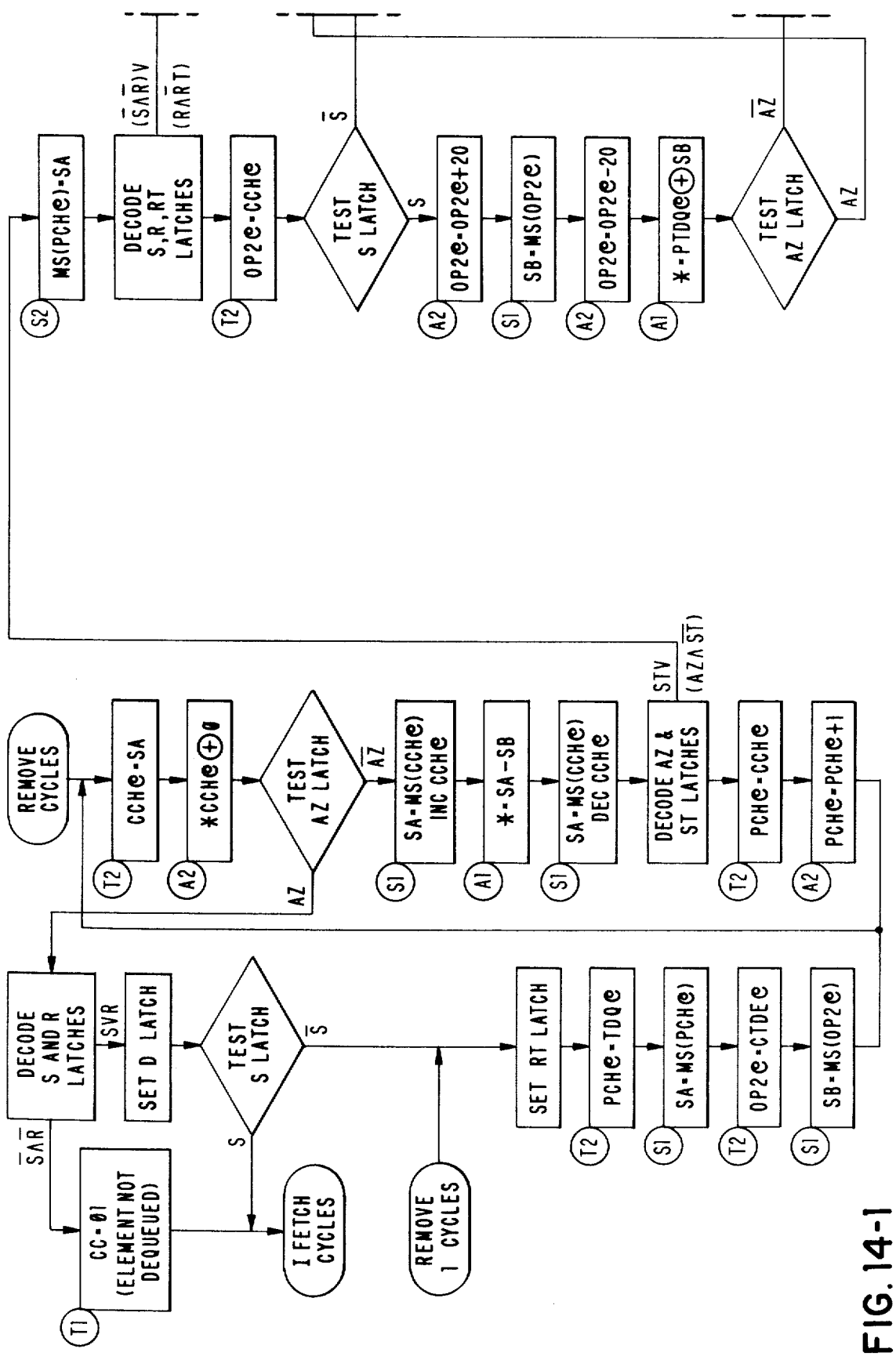
Figures 2, 14:
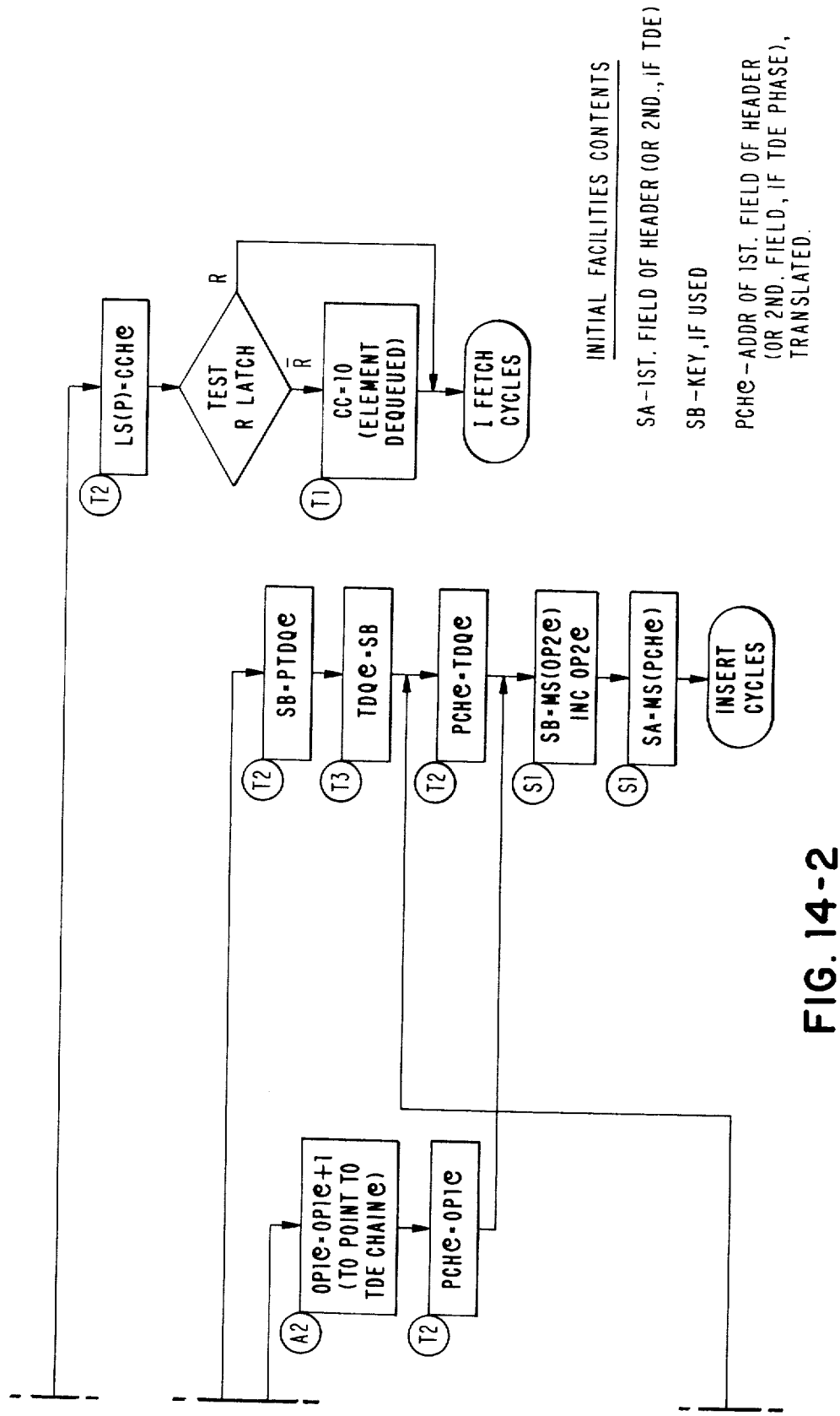

The remove cycles described in the reference application, Ser. No. 813,901, are modified for the present invention. Remove cycles, FIGS. 14-1 and 14-2, start with a T2 CPU cycle. Prior to the T2 CPU cycle, it should be noted that SA register 36 had been loaded with the second field of the SRQ, i.e. the TDE Chain@. This took place during the I-fetch cycle for the send message instruction. The PCH@ SAR 56 was loaded during the send message execution cycle with the address of the second field of the SRQ just prior to the remove cycle. During the T2 CPU cycle, the CCH@ SAR 57 is loaded with the contents of the SA register 36. THE CCH@ SAR 57 contains the address of the current queue element being processed. This T2 CPU cycle is followed by an A2 CPU cycle, where the contents of CCH SAR 57 are examined to determine if they are zero. This is done to determine if there are any TDE's on the SRQ. In FIG. 16 a TDE is enqueued on the SRQ and therefore the CCH address is not zero, and thus the AZ latch 96 will not be set by ALU 45.

A S1 CPU cycle is then taken to fetch the priority field of the TDE enqueued on the SRQ by using the CCH@ from SAR57 and to increment the CCH address. The priority field retrieved from storage 10 is placed into SA register 36. An A1 cycle is then taken to subtract the contents of the SB register 37 from the SA register 36. Register 37 was loaded with the TDE chain address field of the SRQ object. Hence, if the result of the subtract operation is zero, the TDE would be the last TDE enqueued on the SRQ.

A S1 cycle is then taken to fetch the current chain address from main storage 10 and place the same in SA register 36 and the current chain address is decremented. The AZ and ST latches 96 and 97 are decoded to determine the next cycle of operation. In this instance, the TDE being removed from the SRQ is the only TDE on the SRQ. The AZ latch 96 will be set and the ST latch 97 will be reset. This condition causes the next operation to be a S2 CPU cycle where the contents of SA register 36 are written into main storage 10 to store the PCH address. The S, R and RT latches 87, 88 and 98 are decoded by control unit 100. In this instance, the S latch 87 is reset and the R and RT latches 88 and 98 are set. Thus the next operation is to load the contents of the CCH@ SAR 57 into the OP2@ SAR 55 during a T2 cycle. The control unit 100 is setting up the proper condition for switching the operation to insert cycles.

The S latch 87 is tested and if it is set, an A2 CPU cycle is taken to add twenty to the contents of OP2@ SAR 55 and return the results to OP2 SAR 55. The OP2 SAR address was increased by twenty in order to point to the TDQ address field in the TDE which had just been removed from the SRQ. The TDQ address field contains an address designating the TDQ to which the TDE should be enqueued. A storage cycle is then taken to fetch the TDQ address field from main storage 10 as pointed to by the OP2 address from SAR55 and load it into SB register 37. An A2 CPU cycle is then executed to subtract a value of twenty from the contents of OP2@ SAR 55 so as to restore the OP2 address in SAR 55 to a value which points to the first field of the removed TDE. An A1 cycle is then taken to determine if the removed TDE is being sent to the prime TDQ. This is accomplished by exclusive ORing the contents of the PTDQ@ SAR 159 with the contents of SB register 37.

Following the A1 CPU cycle, the AZ latch 96 is tested and if it is set, it is indicative that the removed TDE is destined for the prime TDQ and if it is in the reset state, the removed TDE is destined for a non-prime TDQ. If the removed TDE is destined for the prime TDQ, as shown in FIG. 16, the contents of the prime TDQ@ SAR 159 are loaded into SB register 37 by a T2 CPU cycle. A T3 CPU cycle is then executed to transfer the contents of SB register 37 into the current TDQ@ SAR 52. This was done so that after the D latch 93 has been set, I-fetch cycles will be taken and the task dispatcher will be invoked to switch to the prime TDQ and the highest priority TDE on the prime TDQ will be dispatched. However, before the D latch is set, a T2 CPU cycle is taken to load the current TDQ address from SAR 52 into the PCH@ SAR 56. The next cycle is a S1 CPU cycle, however it should be noted that if the S latch 87 had been in the reset state, an A2 CPU cycle would have been executed to add a one to the contents of the OP1@ SAR 54 and return the results to the OP1@ SAR 54. The purpose of that operation is to point to the TDE chain address field. The A2 CPU cycle is then followed by a T2 CPU cycle for transferring the contents of OP1@ SAR 54 into the PCH@

SAR 56. The S1 CPU cycle is then taken to fetch the contents of the location in main storage 10 pointed to by the address in OP2@ SAR 55 and load them into SB register 37. The OP2 address in SAR 55 is incremented and returned into SAR 55. Another S1 cycle is then taken to load SA register 36 with the contents of a location in main storage 10 addressed by the address in PCH@ SAR 56.

Figure 11:
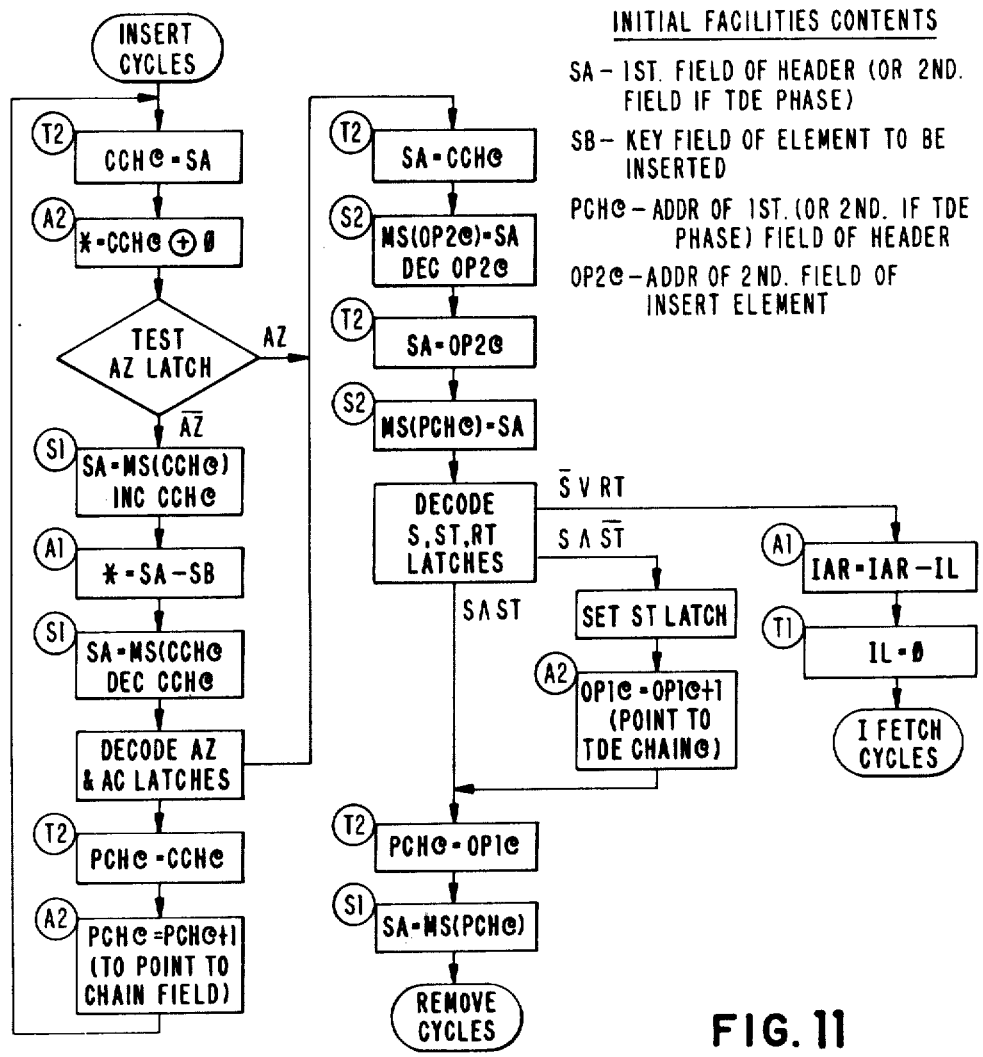
FIG. 11 is a flow diagram illustrating INSERT cycles.
Figure 13:
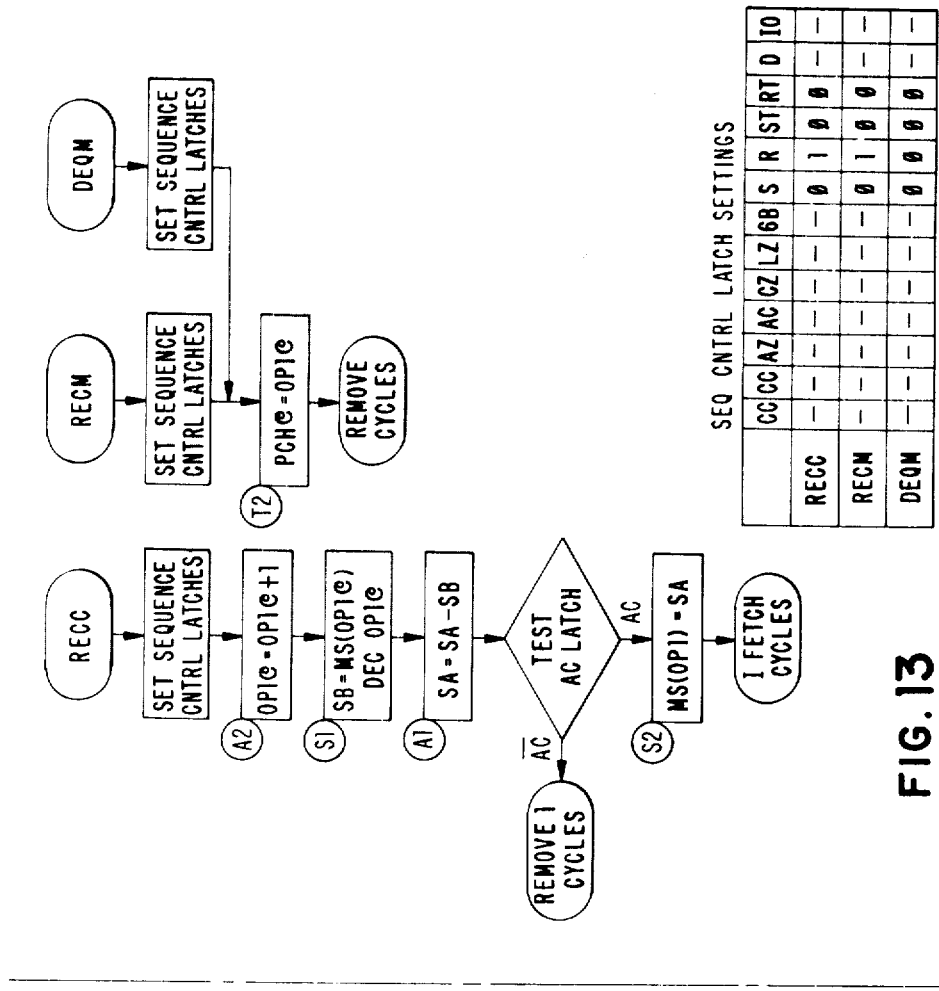
FIG. 13 is a flow diagram illustrating a RECEIVE COUNT, RECEIVE MESSAGE and DEQUEUE MESSAGE execution cycles.
Figure 12:
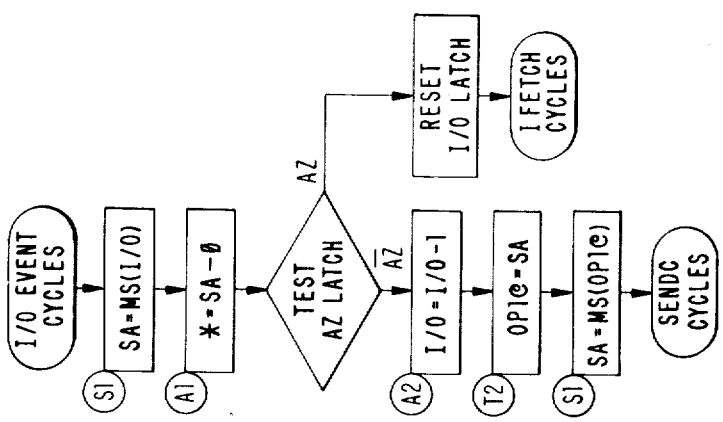
FIG. 12 is a flow diagram illustrating I/O event cycles.

The operation then switches to insert cycles for inserting the removed TDE in priority sequence onto the designated TDQ and in this instance, the prime TDQ. The insert cycles are shown in FIG. 11. The terminal operations of the insert cycles lead to remove cycles and to I-fetch cycles depending upon the decode of the S, ST and RT latches 87, 97 and 98 respectively. In this intance a decode of these latches is such that the terminal operation results in switching to remove cycles. Upon entering the remove cycles, a T2 CPU cycle is taken followed by an A2 CPU cycle as previously described. The AZ latch 96 is tested and in this instance will be found to be set because the current chain address field will be zero and hence there are no more TDEs to be transferred from the SRQ. The S and R latches 87 and 88 are then decoded by control unit 100 and if either the S or the R latch is set, D latch 93 is set. The S latch is then tested and, if it is set, the operation switches to I-fetch cycle. Upon entering the I-fetch cycle as shown in FIG. 6, the operation switches to dispatch cycles because the D latch is set. Dispatch cycles are then taken to perform a task switch and the highest priority TDE on the prime TDQ will be dispatched.

Figure 21:
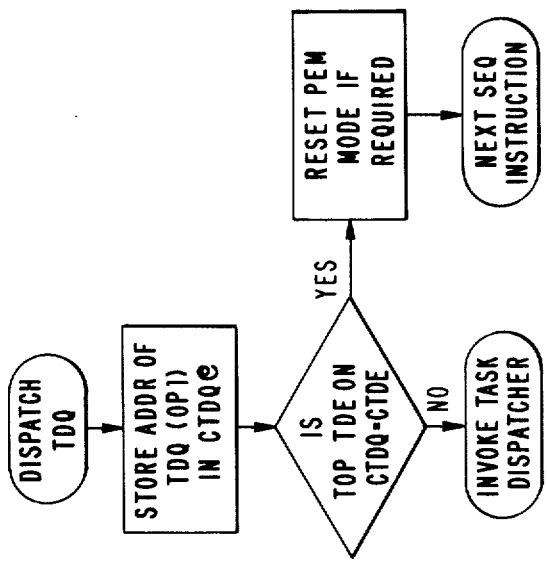
FIG. 21 is a flow diagram for a dispatch TDQ instruction.

It is seen that the dispatch TDQ instruction invokes the task dispatcher and allows tasks to be dispatched from any TDQ. As seen in FIG. 21, if the top or highest priority TDE of the newly designated TDQ is the current TDE, the program event monitor (PEM) mode is enabled or disabled according to the setting of a program event monitor mode bit in the current TDE and the next sequential instruction is executed. Otherwise the task dispatcher is invoked. Thus the TDQ instruction in addition to changing the current TDQ@, is used to enable or disable program event monitoring for the current task.

Figure 17:
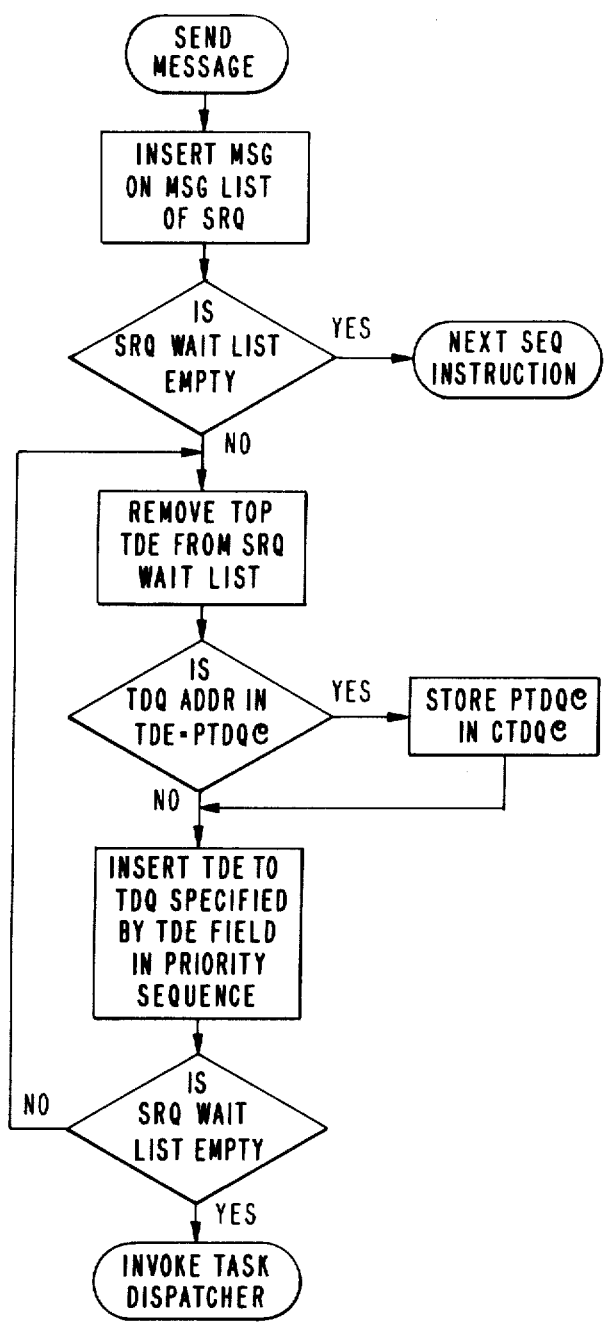
FIG. 17 is a flow diagram for a send message instruction.
Figure 18:
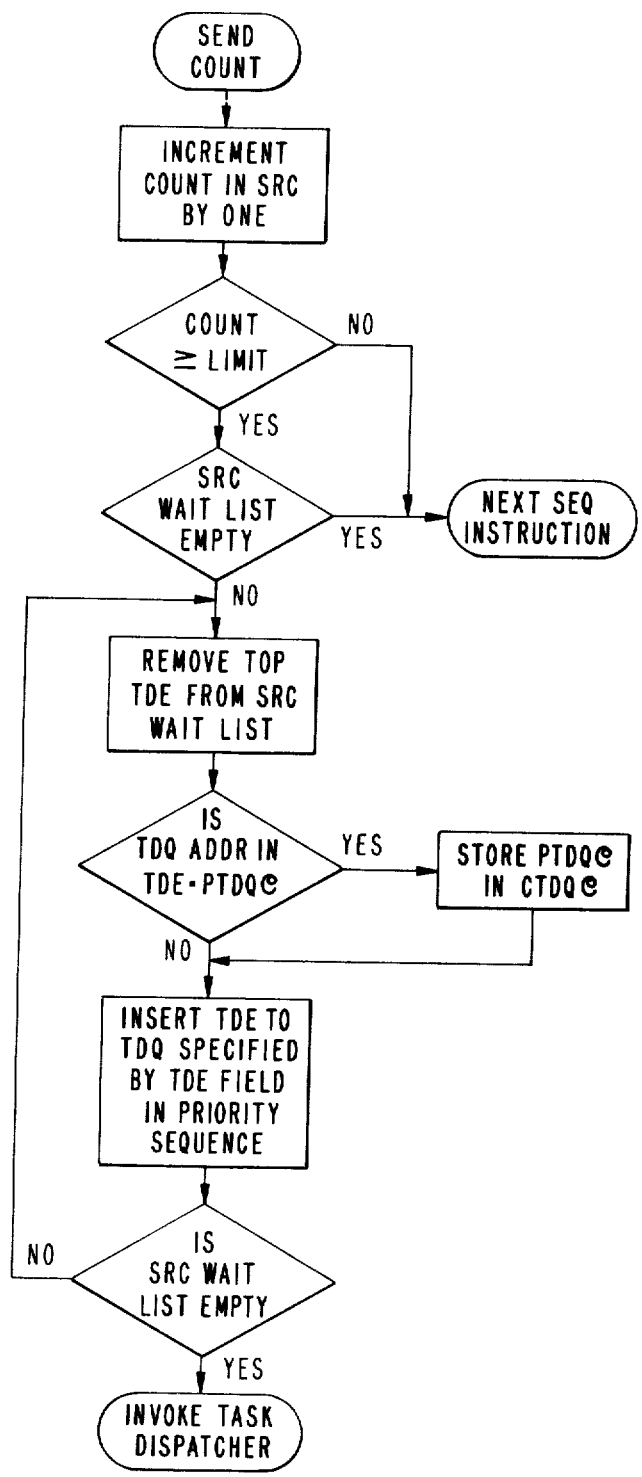
FIG. 18 is a flow diagram for a send count instruction.
Figure 19:
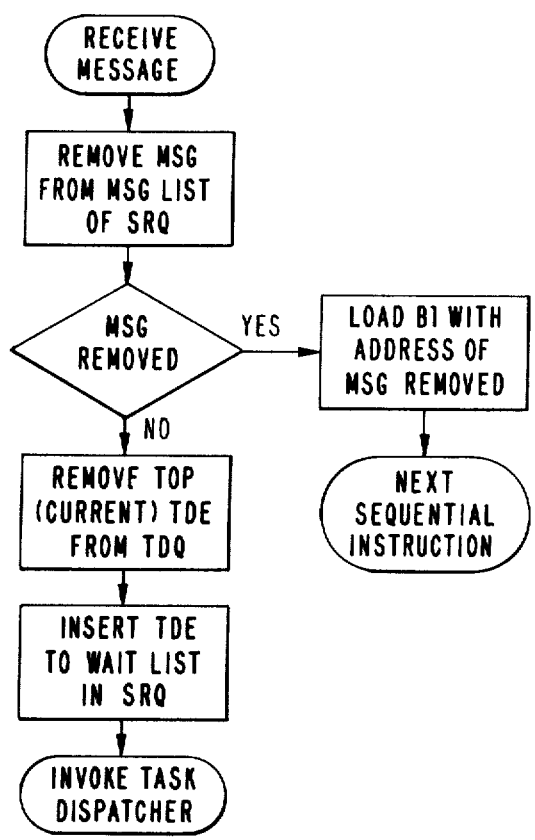
FIG. 19 is a flow diagram for a receive message instruction.
Figure 20:
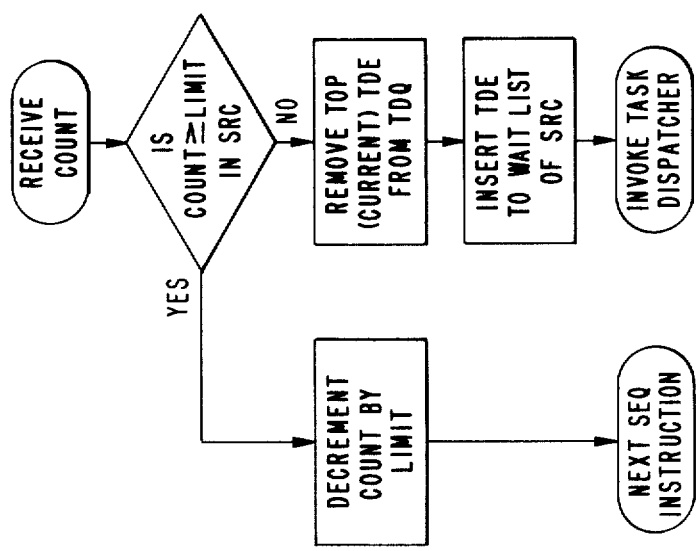
FIG. 20 is a flow diagram for a receive count instruction.

When an implicit or explicit send operation occurs, FIGS. 17 and 18, and a TDE is placed on the prime TDQ which is not the current TDQ or a TDE is placed on the current TDQ at a higher priority than the current TDE, the task dispatcher is invoked. The task dispatcher is also invoked when an implicit or explicit receive operation occurs, FIGS. 19 and 20, and the receive is not satisfied. In such a case, the current TDE is removed from the current TDQ and placed on a SRC or SRQ wait list by the receive mechanism performing the receive function.

Figure 22:
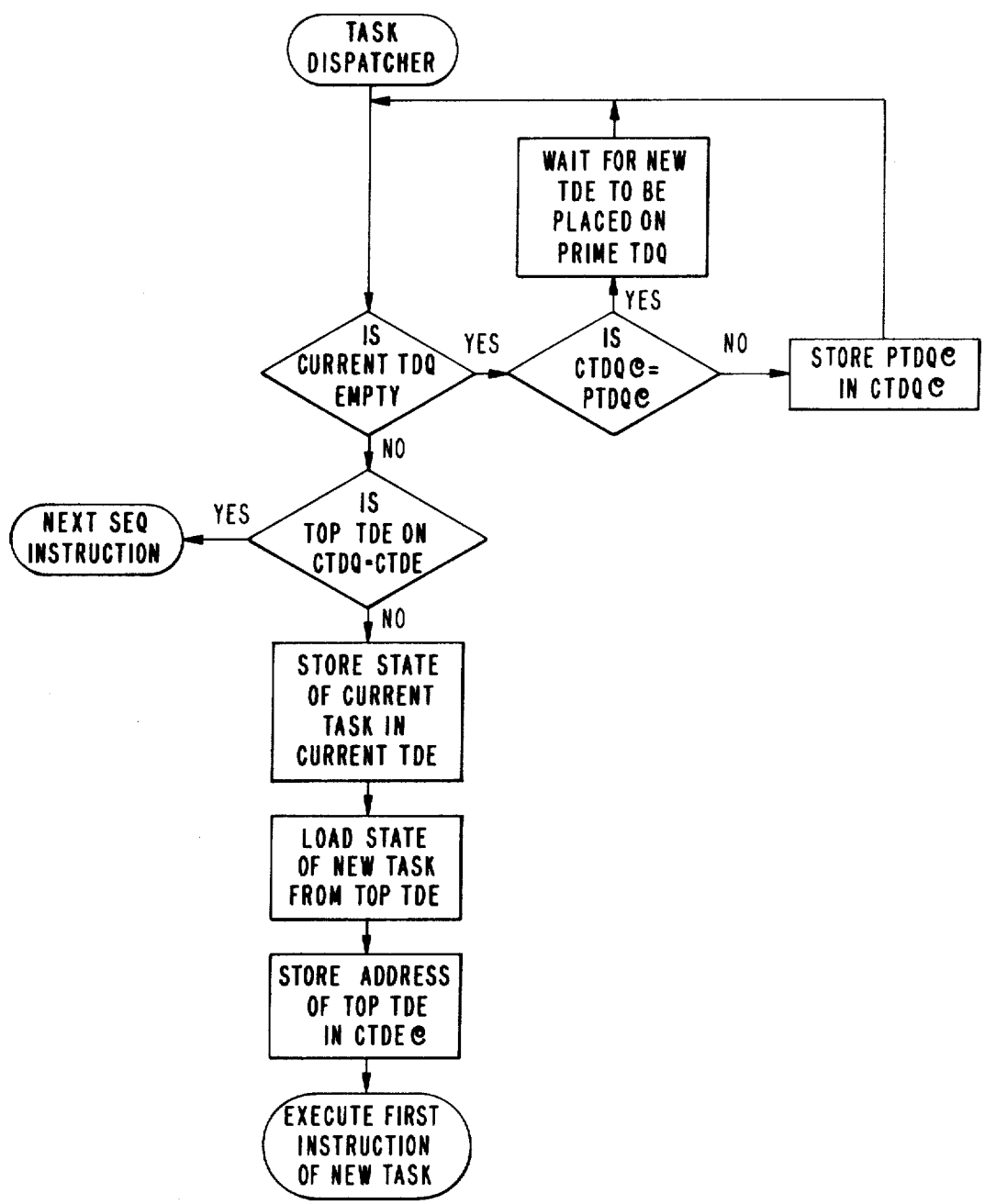
FIG. 22 is a flow diagram of the task dispatcher.

The task dispatcher, FIG. 22, checks to determine if the current TDQ is empty. IF it is empty, it checks to determine if the current TDQ is the prime TDQ. If it is, the CPU is placed in a wait state waiting for a TDE to be enqueued on the prime TDQ and if it is not, the prime TDQ becomes the current TDQ. The highest priority or top TDE on the current TDQ is checked to see if it is a current TDE. If it is, the next sequential instruction is executed. If it is not, the status of the current task is stored and the status of the new task from the top or highest priority TDE is loaded into the CPU. The address of the top or highest priority TDE is stored in the current TDE@ register and the first instruction of that new task is then executed. It is thus seen that the prime TDQ becomes current if the non-prime current TDQ becomes empty, a TDE is returned to the prime TDQ by a send operation or a dispatch TDQ instruction referring to the prime TDQ is executed. A non-prime TDQ becomes current only if a dispatch TDQ instruction referring to the non-prime TDQ is executed.

While the preferred embodiment of the invention has been described and illustrated, it is to be understood that the invention is not limited to the precise constructions herein disclosed and the right is reserved to all changes and modifications coming within the scope of the invention as defined in the appended claims.

Having thus described the invention, what is claimed as new, and desired to be secured by Letters Patent is:

1. Task handling apparatus for a computer system having an addressable main storage for storing data and instructions including a dispatch task dispatching queue instruction, central processing unit (CPU) with means for fetching and executing instructions including said dispatch task dispatching queue instruction, said CPU having a normal active state and switchable into a wait state and input/output devices, the improvement comprising:

a plurality of task dispatching queues containing task dispatching elements in priority sequence each having a priority field, task dispatching element chain address field, status field and task dispatching queue address field, one of said task dispatching queues being a prime task dispatching queue and all others being non-prime task dispatching queues, said task dispatching queues being addressable and having a task dispatching element chain address for locating the highest priority task dispatching element on the task dispatching queue, said task dispatching element chain address having a particular value for indicating that the task dispatching queue has no task dispatching elements enqueued thereon, current task dispatching queue register means for containing an address for addressing a current task dispatching queue, prime task dispatching queue register means for containing an address for addressing said prime task dispatching queue, means for loading said current task dispatching queue register means with a task dispatching queue address in response to said CPU executing a dispatch task dispatching queue instruction, detecting means for detecting said particular value of said task dispatching element chain address, means responsive to said detecting means detecting said particular value of a task dispatching element chain address of a non-prime task dispatching queue for transferring the address in said prime task dispatching queue register means into said current task dispatching queue register means and responsive to said detecting means detecting said particular value of a task dispatching element chain address of said prime task dispatching queue for switching said CPU into said wait state, and task dispatching means having first means for rendering the highest priority task dispatching element of the current task dispatching queue active by loading the contents of its status field into said CPU and having second means for storing task status from said CPU into the status field of the current task dispatching element when said current task dispatching element is not the highest priority task dispatching element on said current task dispatching queue.

2. Task dispatching apparatus for a computer system having main storage, a central processing unit (CPU) and input/output devices, the improvement comprising:
   a source of task dispatching elements,
   a plurality of task dispatching queues where one of said task dispatching queues is a prime queue and all other are non-prime queues, said task dispatching queues each being adapted to contain task dispatching elements enqueued in priority sequence where only one of said task dispatching queues is the current active task dispatching queue at any instant of time and where the highest priority task dispatching element of said current active task dispatching queue is the current active task dispatching element, said current active task dispatching element having an instruction stream being executed by said CPU, said instruction stream including intertask communication instructions and dispatch task dispatching queue instructions,
   intertask communication means operable in response to said CPU executing said intertask communication instructions to enqueue and dequeue task dispatching elements on and from said plurality of said task dispatching queues,
   designating means for designating the current active task dispatching queue,
   task dispatching means operable to dispatch the highest priority task dispatching element from the current active task dispatching queue,
   means for causing said designating means to designate the prime task dispatching queue as the current active task dispatching queue in response to said intertask communication means enqueueing a task dispatching element on said prime task dispatching queue, and
   dispatch task dispatching element means operable under control of a dispatch task dispatching queue instruction executed by said CPU to cause said designating means to designate a task dispatching queue as the current task dispatching queue.

3. The task dispatching apparatus of claim 2 wherein said source of task dispatching elements is in said main storage.

4. The task dispatching apparatus of claim 2 wherein said plurality of task dispatching queues is in said main storage.

5. The task dispatching apparatus of claim 2 further comprising:
   detecting means for detecting when a current non-prime task dispatching queue is empty of task dispatching elements, and
   means for causing said designating means to designate said prime task dispatching queue as the current task dispatching queue in response to said detecting means detecting an empty current non-prime task dispatching queue.

6. The task dispatching apparatus of claim 2 wherein said dispatch task dispatching element means causes said designating means to designate a non-prime task dispatching queue as the current task dispatching queue.

7. The task dispatching apparatus of claim 2 wherein said dispatch task dispatching element means cause said designating means to designate the prime task dispatching queue as the current task dispatching queue.

8. Task dispatching apparatus for a computer system having main storage, a central processing unit and input/output (I/O) devices, the improvement comprising:
   a source of task dispatching elements,
   a plurality of task dispatching queues where one of said task dispatching queues is a prime queue and all other are non-prime queues, said task dispatching queues each being adapted to contain task dispatching elements enqueued in priority sequence where only one of said task dispatching queues is the current active task dispatching queue at any instant of time and where the highest priority task dispatching element of said current active task dispatching queue is the current active task dispatching element said current active task dispatching element having an instruction stream being executed by said CPU, said instruction stream including intertask communication instructions and dispatch task dispatching queue instructions,
   intertask communication means operable in response to said CPU executing said intertask communication instructions to enqueue and dequeue task dispatching elements on and from said plurality of task dispatching queues,
   designating means for designating the current active task dispatching queue,
   task dispatching means having first means operable to dispatch the highest priority task dispatching element enqueued on said prime task dispatching queue as the current active task in response to said intertask communication means enqueuing a task dispatching element on said prime task dispatching queue and said enqueued task dispatching element is the highest priority task dispatching element on said prime task dispatching queue and having second means operable to dispatch the highest priority task dispatching element on a designated current active task dispatching queue as the active task, and
   dispatch task dispatching element means operable under control of a dispatch task dispatching queue instruction executed by said CPU to cause said designating means to designate a task dispatching queue from which the highest priority task dispatching element will be dispatched as the active task by said second means of said task dispatching means.

* * * * *